United States Patent [19]

Day et al.

[11] 4,197,187
[45] Apr. 8, 1980

[54] HYDROCARBON CONVERSION

[75] Inventors: Michael A. Day; David Jackson; Roy J. Sampson, all of Middlesbrough, England

[73] Assignee: Imperial Chemical Industries Limited, London, England

[21] Appl. No.: 921,516

[22] Filed: Jul. 3, 1978

[30] Foreign Application Priority Data

Jul. 11, 1977 [GB] United Kingdom ............... 28986/77

[51] Int. Cl.² ............................................. C10G 35/08
[52] U.S. Cl. .................................. 208/138; 208/139; 252/466 PT
[58] Field of Search ............................... 208/138, 139; 252/446 PT

[56] References Cited

U.S. PATENT DOCUMENTS 3,977,999  8/1976  Erickson .............................. 208/138

OTHER PUBLICATIONS

Fletcher et al, Chemistry Industry, Jan. 13, 1968, pp. 48–51.

*Primary Examiner*—C. Davis
*Attorney, Agent, or Firm*—Cushman, Darby & Cushman

[57] ABSTRACT

Hydrocarbon hydroconversion, especially hydrocarbon reforming, using catalysts whose supports have been prepared by a sol-gel process. For hydrocarbon reforming, it is preferred that the primary particles used to prepare the porous gel should have been prepared by a vapor phase condensation method, for example flame hydrolysis and that the support should have a narrow pore size distribution. The process produces much less gas by hydrocracking at given aromatics yields than comparative processes using conventional catalysts.

19 Claims, No Drawings

HYDROCARBON CONVERSION

The present invention relates to hydrocarbon conversion in the presence of hydrogen and in particular to the reforming of hydrocarbon feedstocks to produce aromatic hydrocarbons.

Hydrocarbon conversion processes are well-known and widely used. Examples of such processes are the reforming of hydrocarbon feedstocks to increase their content of aromatic hydrocarbons and to increase their value as motor gasoline blending feedstocks, isomerisation processes, cracking processes, hydrogenation and dehydrogenation processes. Many of these processes employ catalysts which may comprise one or more metals or metal compounds either on a support or unsupported.

The choice of catalyst is one factor influencing the technical, economic and commercial success of hydrocarbon conversion processes. The catalyst influences not only the rate of conversion but also the range and relative amounts of the various products obtained from any particular feedstock. In addition, it is very desirable that the catalyst should be so formulated that it enjoys a long life. Many proposals have been made for improving the performance of hydrocarbon conversion catalysts including, for example, the use of specific metals or metal compounds for particular conversions and the use of two or more metals on a catalyst support.

According to the present invention a process for converting a hydrocarbon feedstock comprises contacting the hydrocarbon feedstock in the presence of hydrogen and at hydrocarbon conversion conditions with a catalyst comprising a metal supported on a porous gel of an inorganic substance, the gel having been prepared by a method which comprises dispersing solid primary particles of the inorganic substance in a liquid to form a sol containing colloidal particles which are aggregates of the primary particles, drying the sol to produce a porous gel and calcining the porous gel.

The hydrocarbon process of the invention includes, for example, reforming, hydroisomerisation, dehydrocyclisation, dehydrogenation, hydrogenation, hydrocracking, hydrodesulphurisation, selective hydrogenation, for example of acetylene in ethylene.

The choice of metal in the catalyst will depend on the hydrocarbon conversion being carried out. For example, for reforming a hydrocarbon charge stock a metal of Group VIII, especially platinum, is preferred while in some hydrogenation reactions a non-noble Group VIII metal, for example nickel, may be preferred. However, for these and other hydrocarbon conversion processes of the invention, other metals, especially other Group VIII metals, may also be suitable. Optionally, the catalyst may contain one or more additional metals, for example rhenium or iridium with platinum in reforming processes.

The amount of metal used in the catalyst will also depend to some extent on the hydrocarbon conversion being carried out and to some extent on the metal being used. However, in most cases the amount of metal is likely to lie in the range 0.01 to 5% by weight of the total catalyst, more preferably in the range 0.1 to 2% by weight, although in some cases, for example when non-noble metals are used, larger amounts even up to say 20% by weight may be suitable.

The porous gel support of the catalyst for use in the process of this invention is preferably a calcined porous gel of one or more refractory, inorganic oxides, for example alumina, silica, titania, zirconia, and is formed by a "sol-gel" process. Sol-gel processes are described in a paper by Fletcher and Hardy in Chemistry and Industry, Jan. 12, 1968, page 48 and involve the formation of a concentrated sol of the inorganic oxide followed by removal of water, for example by drying on a tray, by solvent extraction, by spray drying or by oil gelation to form the gel. For use as the catalyst support in the process of this invention the porous gel can be formed from sols containing more than one substance. Thus, the sol may contain an additive, for example a compound of yttrium, for example yttria. We have found that an alumina support prepared by a sol-gel technique and containing small amounts of yttrium is particularly suitable for use as a hydrocarbon reforming catalyst. Preferably, the amount of yttrium present in the catalyst is less than 4% by weight (of the total support). In the preparation of the catalyst, it is convenient to add the yttrium at the sol preparation stage, for example in the form of a compound of yttrium, for example the nitrate, which during preparation of the gel is converted to yttria.

Suitable methods of preparation of the porous gel support by a sol-gel technique are described in German patent application No. 2,647,701. In preparing the gel it is preferred that the solid primary particles are substantially spherical and of similar size, non-aggregated and non-hydrated prior to mixing with the liquid used, for example water. The primary particles are preferably between 4 and 50 nm in diameter and are preferably prepared by a vapour phase condensation method, as defined in said German Patent Application. By "vapour phase condensation method" is meant a method which involves a vapour phase intermediate. Examples of vapour phase condensation methods are hydrolysis of volatile halides or alkoxides (e.g. flame hydrolysis of, for example volatile metal halides), evaporation and condensation methods using electron beam, D.C. arc or RF plasma heating, and metal oxidation (e.g. of magnesium) to give a smoke which is then condensed. A particularly suitable method is flame hydrolysis of a halide, for example aluminium chloride, to give the corresponding refractory oxide. The particles formed by flame hydrolysis are then dispersed in a liquid, for example water, to form a sol containing colloidal particles which are aggregates of the particles. The sol is then dried, for example by tray drying in air, spray drying, oil gelation or by the use of a solvent, and calcined in order to improve the strength of the gel and/or modify its sorptive properties. If it is desired to include an additive, for example yttria, in the porous gel, this may be added in an appropriate amount to the sol. Variation of the parameters during preparation of the primary particles, the sol and the gel results in a final product which contains pores of different sizes. Supports with a narrow pore size distribution can be prepared and such supports impart advantageous properties on the final catalyst. The choice of optimum pore size will depend upon the particular hydrocarbon conversion for which the catalyst is to be used. A preferred narrow pore size distribution for the calcined porous gel used as a catalyst support in the process of this invention is that at least 70% of the total pore volume is contained within pores having a size within the range ±25%, more preferably ±10%, of the mean pore size.

The metal component of the catalyst may be added to the porous gel support by any of the usual methods used to prepare supported metal catalysts. The metal component of the catalyst may be present as the metal itself or as a catalytically suitable compound of the method. Among the suitable methods is impregnation of the support with a solution of a compound of the metal, followed by suitable treatment, for example heating and/or reduction, to convert the metal compound to a suitable catalytic form.

A preferred embodiment of the present invention is a process for reforming a hydrocarbon feedstock which comprises contacting the feedstock in the presence of hydrogen and at reforming conditions with a catalyst comprising a metal supported on a porous gel of an inorganic substance, the gel having been prepared by a method which comprises dispersing solid primary particles of the inorganic substance in a liquid to form a sol containing colloidal particles which are aggregates of the primary particles, drying the sol to produce a porous gel, and calcining the porous gel. Preferably, the primary particles are between 4 and 50 nm in diameter and they are conveniently prepared by a vapour phase condensation method, for example flame hydrolysis, as hereinbefore defined.

Preferably, the metal of the catalyst is a Group VIII metal, more preferably platinum, either alone or with one or more additional metals. Optionally, the catalyst may also contain a small amount, for example in the range of 0.3 to 1.5% by weight of a halide, for example chloride. Preferably, the calcined porous gel comprises alumina, optionally containing a small amount of yttria, for example 0.01 to 1% yttria. Preferably, the average diameter of the pores of the calcined porous gel lies in the range 10 to 35 nm and the pore volume lies in the range 0.5 to 1 ml/g, with at least 80% of the pore volume provided by pores having a diameter within the range 10 to 35 nm, preferably within the range 15 to 35 nm, and more preferably with at least 90% of the pore volume provided by pores having a diameter within the range 15 to 35 nm. The surface area of the calcined porous gel suitably lies within the range 80 to 250 m$^2$/g, more suitably within the range 90 to 200 m$^2$/g, preferably with at least 80%, more preferably 90% of the surface area contained in pores of diameter within the range 15 to 35 nm.

The reforming conditions used in this embodiment of the process of this invention will depend on the feedstock used. The feedstock is preferably a light hydrocarbon oil, for example a naphtha fraction. The temperature in the reforming process will generally be in the range 300° to 600° C., more preferably in the range 450° to 540° C. Suitably, the feedstock may contain a small amount, say 0.2 to 2 ppm, of chloride and if desired water may be added to the feedstock in sufficient quantity to maintain a level of water in the feedstock in the range 1 to 10 ppm and in the recycle gas stream in the range 10 to 30 ppm. The pressure in the reaction zone may be atmospheric or superatmospheric, preferably lying in the range 25 to 1000 psig, more preferably in the range 50 to 400 psig. The particular relationship of temperature and pressure, together with the liquid hourly space velocity, is chosen depending on the nature of the reforming reaction required. In general, however, the liquid hourly space velocity will lie in the range 0.1 to 10. The reforming reaction is effected in the presence of hydrogen and a suitable molar ratio of hydrogen to hydrocarbon feed lies in the range 0.5:1 to 10:1.

The process of the invention is illustrated in the following Example.

EXAMPLE

The reforming of a naphtha feedstock was investigated using two conventional, commercial catalysts (Catalysts D and E) and three catalysts each comprising platinum on a porous gel support (Catalysts A, B and C).

The supports for catalysts A, B and C were prepared by a sol gel method using primary particles of alumina prepared by flame hydrolysis of aluminium chloride and as broadly described in German Patent Application No. 2,647,701. In the case of catalysts A and B a small amount of yttria was also present. The particles of porous gel were then impregnated with a solution of chloroplatinic acid, dried, calcined at 550° C., reduced in hydrogen at 450° C. and then treated with an air stream containing hydrochloric acid vapour at 500° C.

Compositions and properties of catalysts A, B and C are shown in Table 1.

Table 1

| SUPPORT | A Calcined sol/gel alumina | B Calcined sol/gel alumina | C Calcined sol/gel alumina |
|---|---|---|---|
| Metal Content (% Weight) | | | |
| platinium | 0.34 | 0.33 | 0.39 |
| yttrium | 0.14 | 0.14 | — |
| Chloride (% weight) | 0.77 | 0.86 | 0.72 |
| total surface area (m$^2$/g) | 112 | 112 | 112 |
| pore volume (ml/g) | 0.71 | 0.71 | 0.71 |
| average pore diameter (nm) | 23 | 23 | 23 |
| pore size distribution | For each catalyst, 70% of the pore volume is contained in pores of diameter in the range 20 to 25nm. | | |

Note:
Pore size distributions were measured by mercury porosimetry.

The catalysts were tested in a laboratory reforming apparatus at temperatures in the range 470° to 520° C., a pressure of 300 psig, a weight hourly space velocity of 2.5$^{-1}$ and a hydrogen to hydrocarbon mole ration of 6. The feedstock was a C$_6$ to C$_9$ naphtha containing (w/w) 61% paraffins, 28.4% naphthenes and 10.6% aromatics.

Typical yields from a large number of runs, measured as % w/w on feed of aromatics and of hydrogen and C$_1$ to C$_4$ products are shown in Table 2.

Table 2

| Aromatics yield wt % on feed | Catalyst | Temperature °C. | H$_2$,C$_{1-4}$gas yield wt % on feed |
|---|---|---|---|
| 38 | A | 483 | 7.7 |
| 38 | B | 483 | 7.7 |
| 38 | C | 483 | 9.7 |
| 38 | D | 480 | 11.3 |
| 38 | E | 475 | 11.2 |
| 44 | A | 501 | 13.0 |
| 44 | B | 501 | 13.0 |
| 44 | C | 501 | 15.0 |
| 44 | D | 500 | 17.0 |
| 44 | E | 498 | 15.6 |

It can be seen that catalysts A, B and C produce much less gas by hydrocracking at given aromatics yields than catalysts D and E. Catalysts A, B, and C are therefore more selective towards aromatization than Catalysts D and E and they give improved yields of useful products compared to the commercial catalysts.

We claim:

1. A process for converting a hydrocarbon feedstock which comprises contacting the hydrocarbon feedstock in the presence of hydrogen and at hydrocarbon conversion conditions with a catalyst comprising a metal supported on a porous gel of an inorganic substance, the gel having been prepared by a method which comprises dispersing solid primary particles of the inorganic substance in a liquid to form a sol containing colloidal particles which are aggregates of the primary particles, drying the sol to produce a porous gel and calcining the porous gel.

2. A process as claimed in claim 1 in which the catalyst comprises 0.01 to 5% by weight (of the total catalyst) of a metal of Group 8 of the Periodic Table.

3. A process as claimed in claim 1 in which the solid primary particles used in preparation of the porous gel are substantially spherical, non-aggregated and non-hydrated prior to mixing with the liquid.

4. A process as claimed in claim 1 in which the solid primary particles used in preparation of the porous gel are those produced by a vapour phase condensation method.

5. A process as claimed in claim 4 in which the solid primary particles are those produced by flame hydrolysis.

6. A process as claimed in claim 1 in which the solid primary particles have a particle size in the range 4 to 50 nm.

7. A process as claimed in claim 1 in which the solid primary particles are of one or more refractory inorganic oxides.

8. A process as claimed in claim 1 in which the porous gel support has a pore size distribution such that at least 70% of the total pore volume is contained within pores having a size within the range ±25% of the mean pore size.

9. A process as claimed in claim 1 for reforming a hydrocarbon feedstock which comprises contacting the feedstock in the presence of hydrogen and at reforming conditions with a catalyst comprising a metal supported on a porous gel of an inorganic substance, the gel having been prepared by a method which comprises dispersing solid primary particles of the inorganic substance in a liquid to form a sol containing colloidal particles which are aggregates of the primary particles, drying the sol to produce a porous gel, and calcining the porous gel.

10. A process as claimed in claim 9 in which the porous gel comprises alumina.

11. A process as claimed in claim 10 in which the porous gel contains 0.01 to 1% yttria.

12. A process as claimed in claim 9 in which the average diameter of the pores of the calcined porous gel lies in the range 10 to 35 nm.

13. A process as claimed in claim 9 in which the pore volume of the calcined porous gel lies in the range 0.5 to 1 ml/g with at least 80% of the pore volume being provided by pores having a diameter within the range 10 to 35 nm.

14. A process as claimed in claim 9 in which the surface area of the calcined porous gel is within the range 80 to 250 $m^2/g$, and in which at least 80% of the surface area is contained in pores of diameter within the range 15 to 35 nm.

15. A process as claimed in claim 1 for reforming a hydrocarbon feedstock which comprises contacting the hydrocarbon feedstock in the presence of hydrogen and at reforming conditions with a catalyst comprising platinum supported on a porous gel of a refractory inorganic oxide, the gel having been prepared by a method which comprises dispersing in water solid primary particles of the refractory inorganic oxide, which primary particles have been prepared by flame hydrolysis, to form a sol containing colloidal particles which are aggregates of the primary particles, drying the sol to produce a porous gel and calcining the porous gel, the average diameter of the pores of the calcined porous gel lying within the range of 10 to 35 nm, the pore volume lying within the range 0.5 to 1 ml/g and the surface area lying within the range 80 to 250 $m^2/g$.

16. A process for converting a hydrocarbon feedstock which comprises contacting the hydrocarbon feedstock in the presence of hydrogen and at hydrocarbon conversion conditions with a catalyst comprising 0.01 to 5% by weight of the total catalyst of a metal of Group 8 of the Periodic Table supported on a porous gel of an inorganic substance, the gel having been prepared by a method which comprises dispersing solid primary particles of the inorganic substance having a particle size in the range of 4 to 50 nm in a liquid to form a sol containing colloidal particles which are aggregates of the primary particles, drying the sol to produce a porous gel and calcining the porous gel, the solid primary particles used in preparation of the porous gel being substantially spherical, non-aggregated and non-hydrated prior to mixing with the liquid.

17. A process for converting a hydrocarbon feedstock which comprises contacting the hydrocarbon feed-stock in the presence of hydrogen and at hydrocarbon conversion conditions with a catalyst comprising 0.01 to 5% by weight of the total catalyst of a metal of Group 8 of the Periodic Table supported on a porous gel of an inorganic substance, the porous gel support having a pore size distribution such that at least 70% of the total pore volume is contained within pores having a size within the range of ±25% of the mean pore size, the gel having been prepared by a method which comprises dispersing solid primary particles of the inorganic substance in a liquid to form a sol containing colloidal particles which are aggregates of the primary particles, drying the sol to produce a porous gel and calcining the porous gel.

18. A process for reforming a hydrocarbon feedstock which comprises contacting the hydrocarbon feedstock in the presence of hydrogen and at reforming conditions with a catalyst comprising a metal supported on a porous gel comprising alumina, the gel having been prepared by a method which comprises dispersing solid primary particles comprising alumina in a liquid to form a sol containing colloidal particles which are aggregates of the primary particles, drying the sol to produce a porous gel, and calcining the porous gel, the average diameter of the pores of the calcined porous gel lies in the range of 10 to 35 nm, the pore volume lying in the range 0.5 to 1 ml/g with at least 80% of the pore volume being provided by pores having a diameter within the range 10 to 35 nm, and the surface area of the calcined porous gel is within the range 80 to 250 $m^2/g$.

19. A process for reforming a hydrocarbon feedstock which comprises contacting the hydrocarbon feedstock in the presence of hydrogen and at reforming conditions with a catalyst comprising platinum supported on a porous gel of alumina, the gel having been prepared by a method which comprises dispersing in water solid primary particles of alumina, which primary particles have been prepared by flame hydrolysis, to form a sol containing colloidal particles which are aggregates of the primary particles, drying the sol to produce a porous gel and calcining the porous gel, the average diameter of the pores of the calcined porous gel lying within the range of 10 to 35 nm, the pore volume lying within the range 0.5 to 1 ml/g and the surface area lying within the range 80 to 250 m$^2$/g.

* * * * *